(No Model.)
J. B. DUNLOP, Sr. & J. B. DUNLOP, Jr.
PNEUMATIC TIRE.
No. 523,270. Patented July 17, 1894.
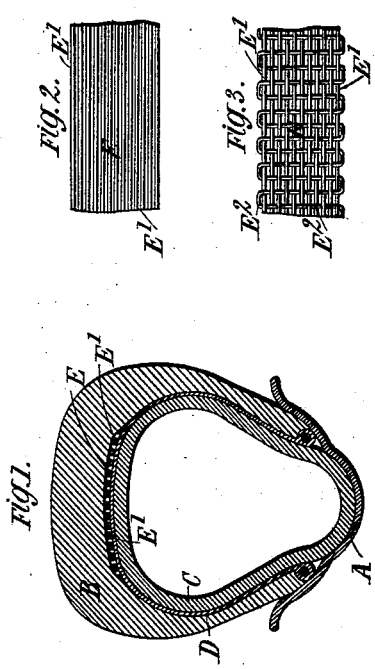
Witnesses:
G. W. Rea.
J. A. Saul.
Inventors;
John Boyd Dunlop, Sr.
and John Boyd Dunlop, Jr.
By James L. Norris
Atty.

UNITED STATES PATENT OFFICE.

JOHN BOYD DUNLOP, SR., AND JOHN BOYD DUNLOP, JR., OF DUBLIN, IRELAND; SAID DUNLOP, JR., ASSIGNOR TO SAID DUNLOP, SR.

PNEUMATIC TIRE.

SPECIFICATION forming part of Letters Patent No. 523,270, dated July 17, 1894.

Application filed July 6, 1893. Serial No. 479,696. (No model.)

*To all whom it may concern:*

Be it known that we, JOHN BOYD DUNLOP, Sr., veterinary surgeon, and JOHN BOYD DUNLOP, Jr., student, both subjects of the Queen of Great Britain, and both residents of Black Rock, Dublin, Ireland, have invented certain new and useful Improvements in Pneumatic Tires for the Wheels of Velocipedes and other Vehicles, of which the following is a specification, reference being had to the accompanying drawings.

Our invention relates to pneumatic tires for the wheels of velocipedes and other vehicles, and has for its object to so provide that the tread portion of the tire is strengthened, the friction between the tire and the road surface is reduced and the speed of the vehicle correspondingly increased.

According to our invention we provide a strengthening band made up of a number of separate threads held together by solution or other means and we place the same between the canvas jacket of the air tube and the cover of a pneumatic tire in such a manner that the threads of which the band is composed extend circumferentially or longitudinally round the tire. We sometimes use a band in which the longitudinal threads are kept in position and in the form of a band by cross threads, for instance the band may be made of a woven fabric in which the longitudinal threads are much stronger or closer together than the cross threads.

In order that our invention may be more clearly understood we will now describe the manner of carrying it into practice.

In the accompanying drawings, Figure 1 is a cross section of a tire fitted to a velocipede wheel rim for example and provided with a strengthening band according to our invention. Fig. 2 is a view of a portion of the band. Fig. 3 is a view of a portion of a band in which cross threads are used for maintaining the longitudinal threads of the band in position.

Referring now to Fig. 1. A is the rim of the wheel, B is the outer cover of the pneumatic tire, C the air tube thereof and D the inexpansible jacket surrounding said air tube. E is an endless band or strip composed of longitudinal threads E' E', held together by cement or solution, a view of a portion of this band being shown in Fig. 2.

The band E is made slightly shorter in circumference than the largest circumference of the jacket D, the result being that the tread surface of the said jacket is flattened as shown in Fig. 1 when the tire is inflated. We sometimes secure the band to the canvas jacket or to the inside of the outer cover B or we may leave it entirely loose between the two the radial pressure of air in the tire keeping it in position. Or we may place the band on the outside of the rubber cover of the tire, said band being covered with a strip of rubber to protect it from wear on the road.

In order to prevent any possibility of the several threads of the band becoming separated we may use cross-threads as shown at $E^2$ in Fig. 3 for keeping the band in shape. In making a band of this description we generally prefer to weave it with the longitudinal threads E' stronger or closer together or both stronger and closer together than the cross threads $E^2$. A band woven in this manner may be covered with rubber or not as desired.

The canvas jacket D is made of cloth woven on the straight and the other parts of the tire are constructed in any ordinary manner.

We sometimes dispense with a separate strengthening band and use a canvas cover or jacket woven straight with the longitudinal or circumferential threads which are near the center of the cover or jacket, that is to say at the tread portion thereof, stronger, or closer and stronger than the longitudinal threads which are nearer to the edges or sides of the tire. Moreover the longitudinal threads are stronger, or closer and stronger than the cross threads of the jacket.

The canvas cover is cut or made short enough to have the effect of slightly flattening the jacket at its circumference, when inflated, as shown in Fig. 1.

In a tire so constructed a greater tensional stress, obviously, falls on the longitudinal threads at the tread than on the other longitudinal threads and cross threads of the jacket, therefore the threads are strongest or closer together where the tire is subject to the greatest stress.

The longitudinal threads in the woven cover or jacket close to the rim are subject to comparatively little stress. We sometimes make all the longitudinal threads in said jacket comparatively weak or wider apart than the cross threads and strengthen the said jacket at the tread by means of a strong woven band or band of straight threads extending circumferentially round the tire.

In some cases we form the strengthening band of two or more folds of canvas and thereby increase the number of longitudinal threads which obviously is the equivalent of longitudinal threads which are stronger or woven closer together.

When our improved strengthening band is used the wear of the canvas jacket if such is provided is to a great extent taken by the strong longitudinal threads of the band. The tire is moreover rendered firmer in a circumferential direction yet at the same time owing to the absence or weakness of the cross threads the lateral stiffness is not increased.

What we claim is—

1. In a pneumatic tire, the combination with a jacket of textile fabric having longitudinal threads which extend circumferentially round the tire and transverse threads extending across the tire, of a strengthening band of textile fabric the warp extending circumferentially round the tire and the weft extending across the tire, the warp being stronger than the weft, substantially as, and for the purpose, specified.

2. In a pneumatic tire, the combination with a jacket of textile fabric having longitudinal threads which extend circumferentially round the tire and transverse threads extending across the tire, of a strengthening band of textile fabric the warp extending circumferentially round the tire, the yarns composing the warp being stronger than those composing the weft, substantially as, and for the purpose, specified.

3. In a pneumatic tire, the combination with a jacket of textile fabric having longitudinal threads which extend circumferentially round the tire and transverse threads extending across the tire, of a strengthening band made up of yarns extending circumferentially round the tire stronger or closer and stronger than the threads composing the said jacket, substantially as, and for the purpose, specified.

4. In a pneumatic tire, a jacket of textile fabric having longitudinal threads which extend circumferentially round the tire and transverse threads extending across the tire, said longitudinal threads at the tread portion thereof being stronger or closer and stronger than the said transverse threads, as and for the purpose specified.

5. In a pneumatic tire, a jacket of textile fabric having longitudinal threads which extend circumferentially round the tire and transverse threads extending across the tire, said longitudinal threads at the tread portion thereof being stronger or closer and stronger than the circumferential threads at the sides of the tire and the transverse threads which extend across the tire, as and for the purpose specified.

In witness whereof we have hereunto set our hands this 19th day of June, 1893.

JOHN BOYD DUNLOP, Sr.
JOHN BOYD DUNLOP, Jr.

Witnesses:
ALEXANDER GREEN,
    70 *Drumcondra Rd., Dublin.*
LAURENCE J. O'HIGGINS,
    *Oriel House, Dublin.*